(12) United States Patent
Gupta et al.

(10) Patent No.: US 12,547,907 B2
(45) Date of Patent: Feb. 10, 2026

(54) DETECTING AND RECTIFYING MODEL DRIFT USING GOVERNANCE

(71) Applicant: INTERNATIONAL BUSINESS MACHINES CORPORATION, Armonk, NY (US)

(72) Inventors: Neerju Gupta, Chelmsford, MA (US); Namit Kabra, Hyderabad (IN); Yannick Saillet, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 17/933,907

(22) Filed: Sep. 21, 2022

(65) Prior Publication Data

US 2024/0095547 A1 Mar. 21, 2024

(51) Int. Cl.
*G06N 20/20* (2019.01)
*G06F 40/58* (2020.01)
*G06N 5/022* (2023.01)

(52) U.S. Cl.
CPC ............. *G06N 5/022* (2013.01); *G06F 40/58* (2020.01)

(58) Field of Classification Search
CPC ...................................................... G06N 20/20
See application file for complete search history.

(56) References Cited

U.S. PATENT DOCUMENTS

| | | | |
|---|---|---|---|
| 7,630,950 | B2 | 12/2009 | Wang |
| 8,533,222 | B2 | 9/2013 | Breckenridge |
| 9,466,033 | B2 | 10/2016 | Ananthanarayanan |
| 10,163,061 | B2 | 12/2018 | Grove |
| 10,248,713 | B2 | 4/2019 | Pallath |
| 10,599,957 | B2 | 3/2020 | Walters |
| 2016/0071027 | A1 | 3/2016 | Brand |
| 2017/0330109 | A1 | 11/2017 | Maughan |
| 2017/0364818 | A1 | 12/2017 | Wu |

OTHER PUBLICATIONS

Ackerman et al. "High-quality Conversational Systems." ARXIV, Apr. 28, 2022, 13 Pages. https://arxiv.org/pdf/2204.13043.pdf.
Bhide, "Mitigating AI Model Drift with IBM Watson OpenScale", IBM, Accessed on Aug. 25, 22, 5 Pages. Retrieved from Internet: https://towardsdatascience.com/concept-drift-and-model-decay-in-machine-learning-a98a809ea8d4.

(Continued)

*Primary Examiner* — Grace Park
(74) *Attorney, Agent, or Firm* — Tihon Poltavets

(57) ABSTRACT

An embodiment for monitoring machine learning models to detect and rectify model drift using governance. The embodiment may receive a plurality of machine learning models and register the plurality of machine learning models to a governance dashboard. The embodiment may automatically monitor the received plurality of machine learning models to identify factors used by each of the received plurality of machine learning models and generate corresponding clusters of similar machine learning models. The embodiment may automatically detect an incorrect decision made by a target machine learning model and then automatically calculate a correlation score between the target machine learning model and machine learning models within an associated corresponding cluster of similar machine learning models. The embodiment may, in response to detecting a correlation score above a threshold, automatically determine and output a cluster reinforcement recommendation.

20 Claims, 7 Drawing Sheets

(56) References Cited

OTHER PUBLICATIONS

Brownlee, "A Gentle Introduction to Concept Drift in Machine Learning", Machine Learning Mastery, Dec. 15, 2017, 25 Pages. https://machinelearningmastery.com/gentle-introduction-concept-drift-machine-learning/.

Chilakapati, "Concept Drift and Model Decay in Machine Learning", Towards Data Science, Apr. 25, 2019, 13 pages. https://towardsdatascience.com/concept-drift-and-model-decay-in-machine-learning-a98a809ea8d4.

Dunning, "How to Monitor Machine Learning Models in Real-Time", KD nuggets, Accessed on Aug. 11, 2022, 8 Pages. Retrieved from Internet, https://www.kdnuggets.com/2019/01/monitor-machine-learning-real-time.html.

Galstyan, "Non-Parametric Model Drift Detection", USC Information Sciences Institute, Jul. 2016, 38 Pages.

Mell et al., "The NIST Definition of Cloud Computing", Recommendations of the National Institute of Standards and Technology, NIST Special Publication 800-145, Sep. 2011, 7 pages.

Patruno, "The Ultimate Guide to Model Retraining", KD nuggets, [Accessed Jun. 10, 2022], 9 Pages. Retrieved from Internet: https://www.kdnuggets.com/2019/12/ultimate-guide-model-retraining.html.

Santos, "Understanding and Handling Data and Concept Drift", EXPLORIUM, Data Science, Feb. 24, 2020, 8 Pages. https://www.explorium.al/blog/understanding-and-handling-data-and-concept-drift/.

Steeg et al., "Discovering structure in high-dimensional data through correlation explanation." ARXIV, Oct. 31, 2014, 15 Pages. https://arxiv.org/pdf/1406.1222v2.pdf.

DETECTING AND RECTIFYING MODEL DRIFT USING GOVERNANCE

BACKGROUND

The present application relates generally to managing machine learning models, and more particularly, to monitoring machine learning models to detect and rectify model drift using governance.

Machine learning models, such as neural networks, Bayesian networks, and Gaussian mixture models, for example, are often utilized to make predictions based on current operational data. The accuracy of a prediction by a machine learning model is in part based on the similarity of the current operational data to the training data on which the machine learning model was trained. A method for detecting and rectifying model drift within machine learning models would be advantageous for any entity that utilizes machine learning models.

SUMMARY

According to one embodiment, a method, computer system, and computer program product for monitoring machine learning models to detect and rectify model drift using governance is provided. The embodiment may include receiving a plurality of machine learning models and registering the plurality of machine learning models to a governance dashboard. The embodiment may also include automatically monitoring the received plurality of machine learning models to identify a set of features used by each of the received plurality of machine learning models, and mapping the identified features to a business glossary to generate a list of factors used by each of the received plurality of machine learning models. The embodiment may also include automatically comparing the generated list of identified factors used by each of the received plurality of machine learning models to generate corresponding clusters of similar machine learning models. The embodiment may further include automatically detecting an incorrect decision made by a target machine learning model contained within the plurality of received machine learning models and identifying one or more factors from the list of factors used by the target machine learning model that led to the incorrect decision. The embodiment may also include automatically generating an updated efficacy score and a criticality score for the target machine learning model. The embodiment may further include automatically calculating a combined score using the efficacy score and the criticality score to determine and output an alert including a suggested remedial action for the target machine learning model. The embodiment may also include automatically calculating a correlation score between the target machine learning model and machine learning models within an associated corresponding cluster of similar machine learning models that utilize the one or more factors from the list of factors used by the target machine learning model that led to the incorrect decision, and in response to detecting a correlation score above a threshold, automatically determining and outputting a cluster reinforcement recommendation.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
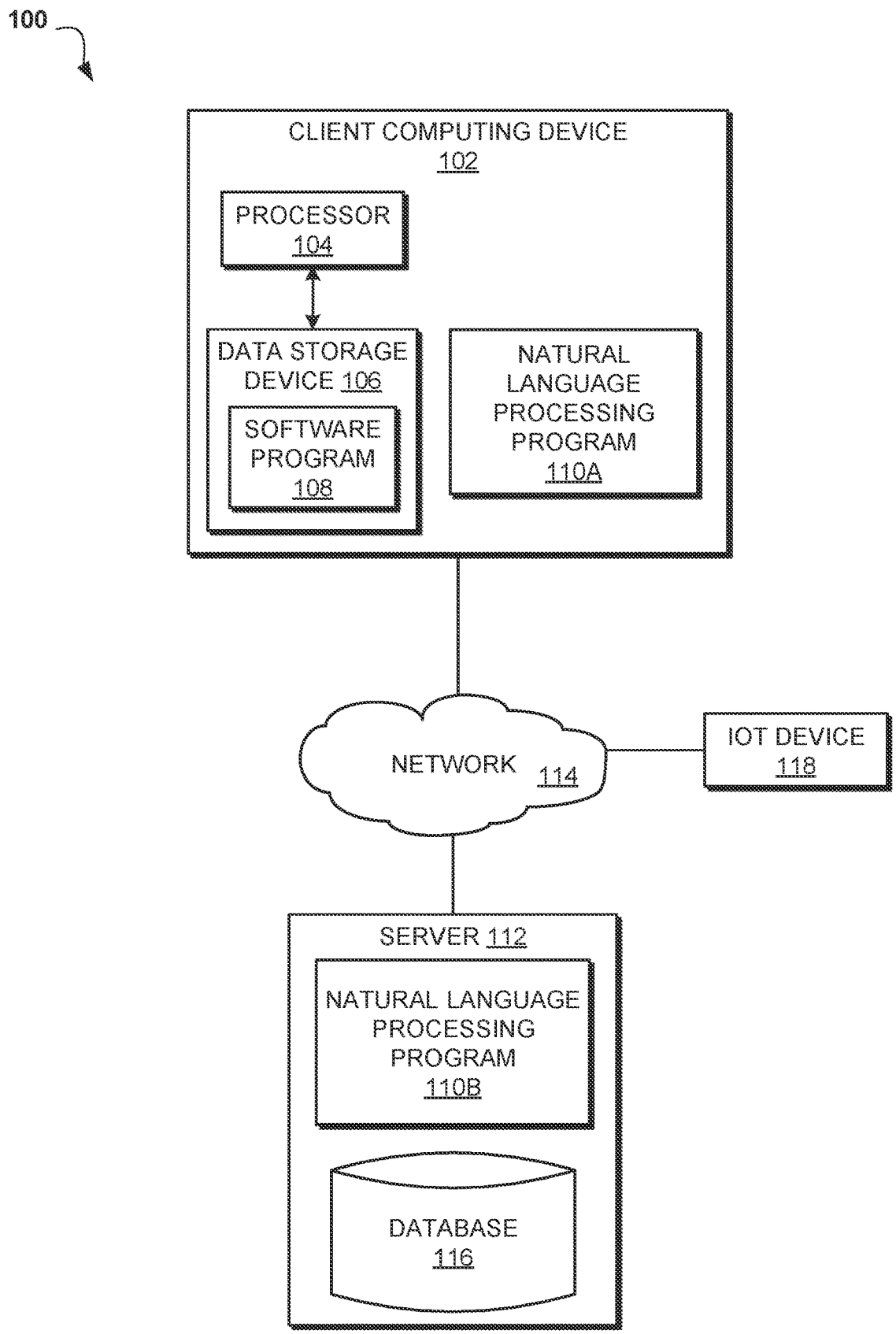
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to managing machine learning models, and more particularly, to monitoring machine learning models to detect and rectify model drift using governance. The following described exemplary embodiments provide a system, method, and program product to, among other things, receive a plurality of machine learning models, and register the plurality of machine learning models to a governance dashboard, automatically monitor the received plurality of machine learning models to identify factors used by each of the received plurality of machine learning models, automatically compare the list of identified factors used by each of the received plurality of machine learning models to generate corresponding clusters of similar machine learning models, automatically detect an incorrect decision made by a target machine learning model, and then automatically calculate a correlation score between the target machine learning model and machine learning models within an associated corresponding cluster of similar machine learning models that utilize the one or more factors from the list of factors used by the target machine learning model that led to the incorrect decision. The provided exemplary embodiments may then, to in response to detecting a correlation score above a threshold, automatically determine and output a cluster reinforcement recommendation. Therefore, the present embodiment has the capacity to improve monitoring of machine learning models to detect and rectify model drift using governance by allowing users to not only maintain individual machine learning models, but preemptively address drift in similar machine learning models that utilize similar factors in making predictions or decisions. This is especially helpful in environments in which multiple machine learning models are being utilized and maintained.

As previously described, Machine learning models, such as neural networks, Bayesian networks, and Gaussian mixture models, for example, are often utilized to make predictions based on current operational data. The accuracy of a prediction by a machine learning model is in part based on the similarity of the current operational data to the training data on which the machine learning model was trained. However, once a machine learning model is deployed, it will slowly degrade in quality overtime without a constant feed of new data or training. This causes concept drift, which causes a given machine learning model to become less accurate and less useful over time. The challenge of drift within machine learning models becomes greater as organizations begin to employ large numbers of machine learning models at once. Accordingly, a method of monitoring machine learning models to detect and rectify model drift using governance, especially in environments having multiple machine learning models deployed, would be advantageous for a variety of business employing such technologies.

According to at least one embodiment of a computer system capable of employing methods in accordance with the present invention to monitor machine learning models to detect and rectify model drift using governance, the method, system, computer program product may receive a plurality of machine learning models and register the plurality of machine learning models to a governance dashboard. The method, system, computer program product may automatically monitor the received plurality of machine learning models to identify a set of features used by each of the received plurality of machine learning models, and map the identified features to a business glossary to generate a list of factors used by each of the received plurality of machine learning models. Next, the method, system, computer program product may automatically compare the generated list of identified factors used by each of the received plurality of machine learning models to generate corresponding clusters of similar machine learning models. According to one embodiment, the method, system, computer program product may then automatically detect an incorrect decision made by a target machine learning model contained within the plurality of received machine learning models and identify one or more factors from the list of factors used by the target machine learning model that led to the incorrect decision. The method, system, computer program product may then automatically generate an updated efficacy score and a criticality score for the target machine learning model. The method, system, computer program product may then automatically calculate a combined score using the efficacy score and the criticality score to determine and output an alert including a suggested remedial action for the target machine learning model. Then, the method, system, computer program product may automatically calculate a correlation score between the target machine learning model and machine learning models within an associated corresponding cluster of similar machine learning models that utilize the one or more factors from the list of factors used by the target machine learning model that led to the incorrect decision, and in response to detecting a correlation score above a threshold, automatically determine and output a cluster reinforcement recommendation. In turn, the method, system, computer program product has provided improved monitoring of machine learning models to detect and rectify model drift using governance, especially in environments having multiple machine learning models, as the method, system, computer program product may detect model drift within similar machine learning models and determine appropriate reinforcement recommendations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for monitoring machine learning models to detect and rectify model drift using governance.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a monitoring program 110A and communicate with the server 112 and IoT Device 118 via the communication network 114, in accordance with one embodiment of the present disclosure. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402*a* and external components 404*a*, respectively.

The server computer 112 may be a laptop computer, netbook computer, personal computer (PC), a desktop computer, or any programmable electronic device or any network of programmable electronic devices capable of hosting and running a monitoring program 110B and a database 116 and communicating with the client computing device 102 and IoT Device 118 via the communication network 114, in accordance with embodiments of the present disclosure. As will be discussed with reference to FIG. 4, the server computer 112 may include internal components 402*b* and external components 404*b*, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a mobile device, a voice-controlled personal assistant, and/or any other IoT Device 118 known in the art for receiving queries that is capable of connecting to the communication network 114, and transmitting and receiving data with the client computing device 102 and the server 112.

According to the present embodiment, the monitoring program 110A,110B may be a program capable of receiving a plurality of machine learning models and registering the plurality of machine learning models to a governance dashboard. Monitoring program 110A,110B may then automatically monitor the received plurality of machine learning models to identify a set of features used by each of the received plurality of machine learning models, and map the identified features to a business glossary to generate a list of factors used by each of the received plurality of machine learning models. Next, monitoring program 110A,110B may automatically compare the generated list of identified factors used by each of the received plurality of machine learning models to generate corresponding clusters of similar machine learning models. Monitoring program 110A,110B may then automatically detect an incorrect decision made by a target machine learning model contained within the plurality of received machine learning models and identify one or more factors from the list of factors used by the target machine learning model that led to the incorrect decision. Then, monitoring program 110A,110B may automatically generate an updated efficacy score and a criticality score for the target machine learning model. Next, monitoring program 110A,110B may automatically calculate a combined score using the efficacy score and the criticality score to determine and output an alert including a suggested remedial action for the target machine learning model. Finally, monitoring program 110A,110B may automatically calculate a correlation score between the target machine learning model and machine learning models within an associated corresponding cluster of similar machine learning models that utilize the one or more factors from the list of factors used by the target machine learning model that led to the incorrect decision, and in response to detecting a correlation score above a threshold, automatically determine and output a cluster reinforcement recommendation. In turn, monitoring program 110A,110B has provided improved monitoring of machine learning models to detect and rectify model drift using governance, especially in environments having multiple machine learning models, as monitoring program 110A,110B may detect model drift within similar machine learning models and determine appropriate reinforcement recommendations.

Figure 2A:
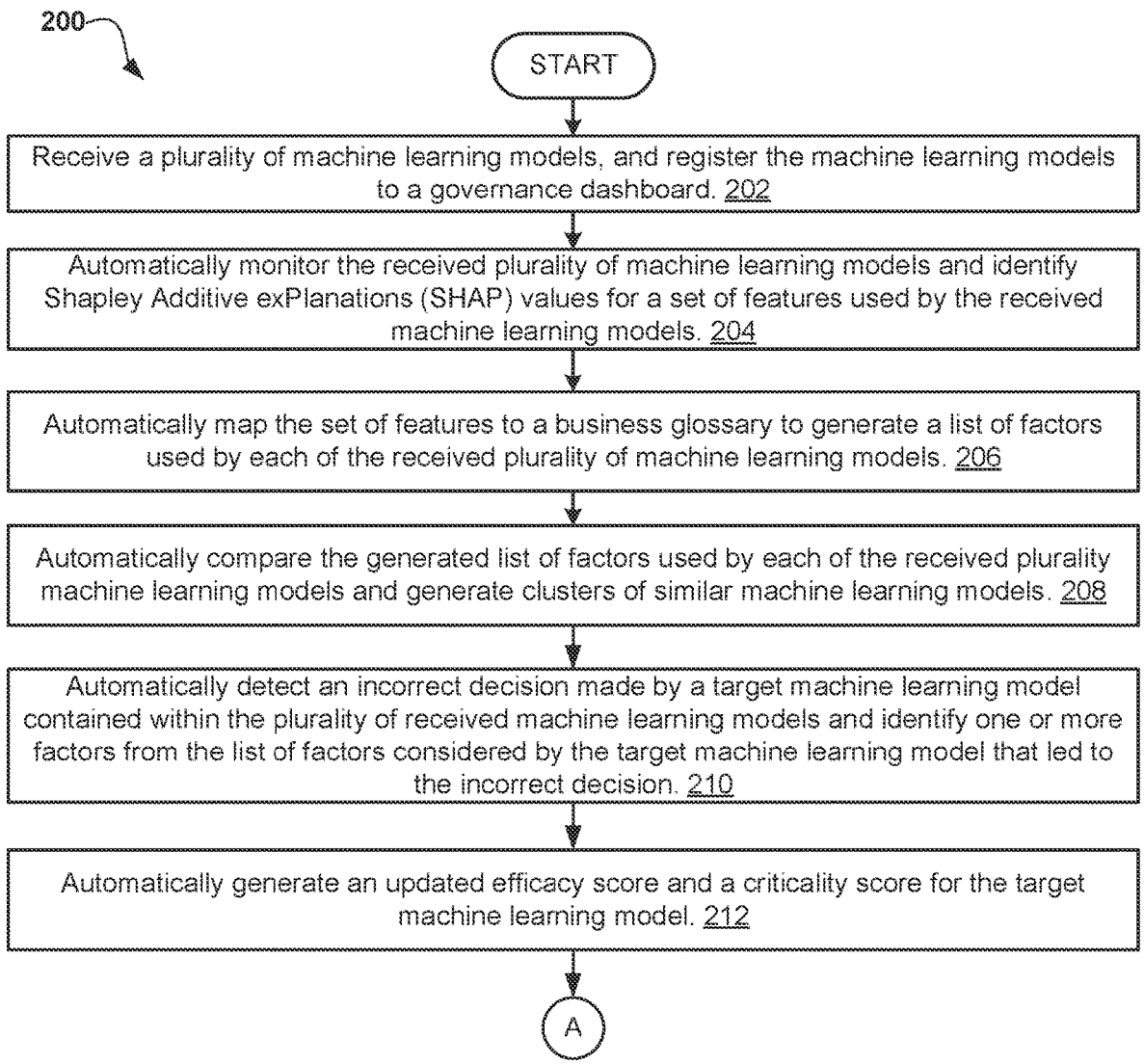
FIG. 2A illustrates an operational flowchart for a process of monitoring machine learning models to detect and rectify model drift using governance according to at least one embodiment.

Referring now to FIG. 2A, an operational flowchart depicting a process 200 for monitoring machine learning models to detect and rectify model drift using governance according to at least one embodiment is provided. At 202, monitoring program 110A,110B receives a plurality of machine learning models, and registers the plurality of machine learning models to a governance dashboard. The governance dashboard provides a framework for controlling access, implementing policies, and tracking activity of registered machine learning models.

At 204, monitoring program 110A,110B automatically monitors the received plurality of machine learning models and identify Shapley Additive exPlanations (SHAP) values for a set of features used by the received machine learning models. As the machine learning models registered to the governance dashboard are employed, monitoring program 110A,110B first identifies what features are being considered in generating a prediction, and then identifies values corresponding to the average marginal contributions of various feature values across all possible coalitions (SHAP values). Monitoring program 110A,110B thus determines for each registered machine learning model, which features are considered in making predictions, and how impactful each of the features are in generating a prediction At 206, monitoring program 110A,110B automatically maps the set of features identified at 204 to a business glossary to generate a list of factors used by each of the received plurality of machine learning models. An exemplary business glossary may include, for example, a controlled vocabulary of terms used within a given organization (or across sub-organizations), major information concepts in an organization, categories used to organize terms into hierarchies, business terms, relationships between business terms, and links between business concepts to technical metadata. In embodiments, a glossary may further contain users and their roles. The benefits of mapping features as described above will be better understood in the context of facilitating the performance of steps performed and described below.

At 208, monitoring program 110A,110B automatically compares the generated lists of factors used by each of the received plurality machine learning models and generates clusters of similar machine learning models. For example, monitoring program 110A,110B may identify a first machine learning model M1, and a second machine learning model M2 that both include generated lists of factors including features F1, F2, and F3 that are weighted similarly in how they are considered by both M1 and M2. Monitoring program 110A,110B could then generate a cluster A of machine learning models that includes at least M1 and M2. In determining similarity of comparable machine learning models for purposes of generating clusters, monitoring program 110A,110B may consider a variety of factors, such as, for example, which factors are considered by the models, how many factors are shared by the models, the weight of the factors considered by the models, and various other features as may be helpful in determining similarity between machine learning models. In other embodiments, monitoring program 110A,110B may use one or more of these described factors to calculate a correlation or similarity score between a given pair of machine learning models and generate clusters including machine learning models having scores above a desired threshold.

Figure 2B:
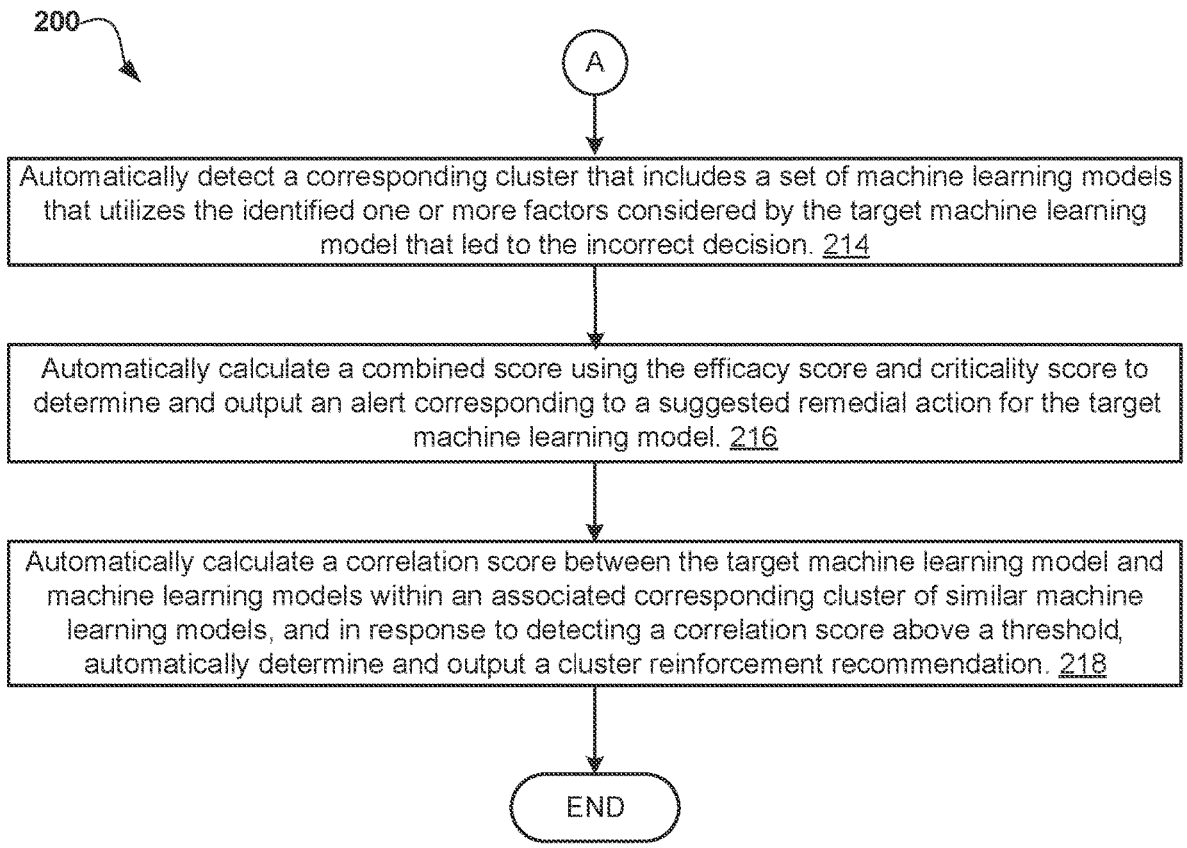
FIG. 2B illustrates a second portion of the operational flowchart of FIG. 2A, depicting a process for monitoring machine learning models to detect and rectify model drift using governance according to at least one embodiment.
Figure 3:
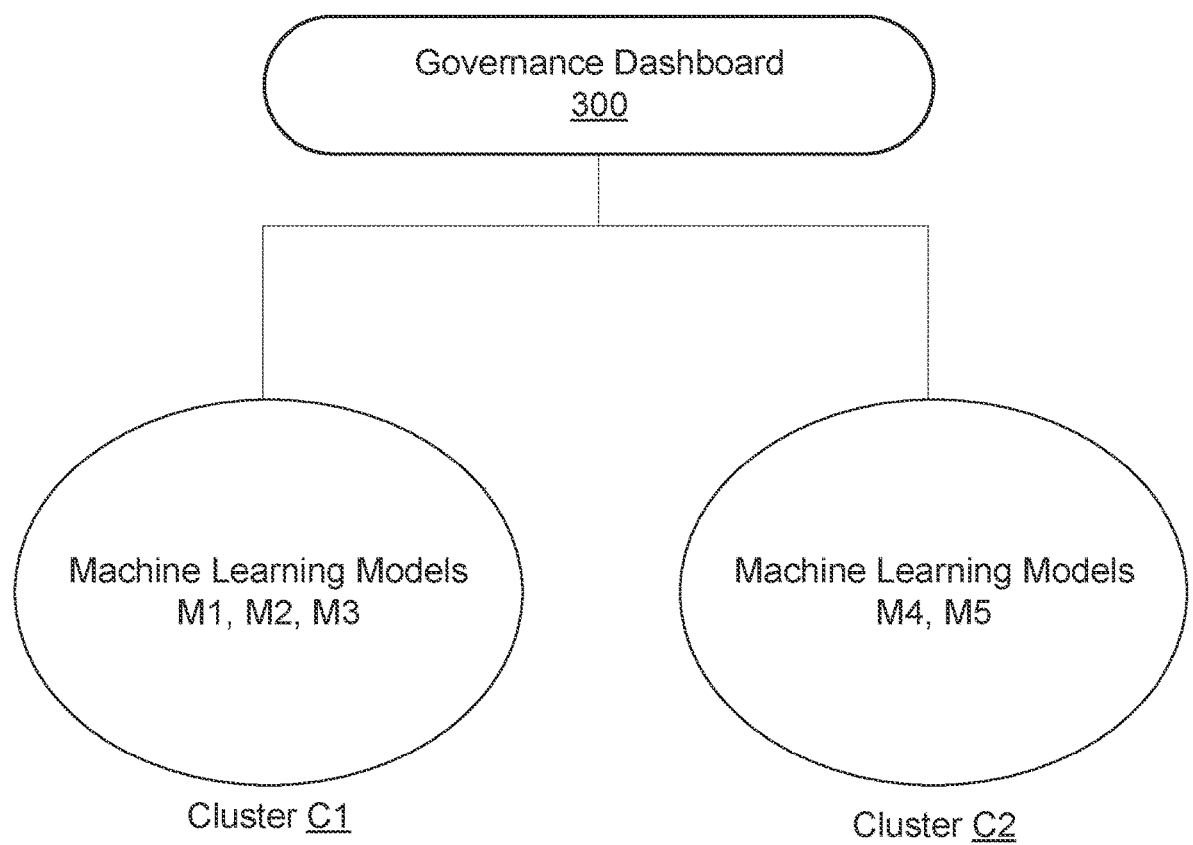
FIG. 3 illustrates a diagram including a governance dashboard and clusters of machine learning models registered thereto according to at least one embodiment.

FIG. 3 depicts a diagram showing a governance dashboard 300 having similar machine learning models M1, M2, and M3 contained in a cluster C1 registered thereto. Machine learning models M4 and M5 are also registered to governance dashboard 300 and are contained in a second cluster C2. Process 200 described in FIGS. 2A and 2B may be used to monitor these similar machine learning models using monitoring program 110A,110B to detect model drift and output remedial recommendations.

At 210, monitoring program 110A,110B automatically detects an incorrect decision made by a target machine learning model contained within the plurality of received machine learning models and identifies one or more factors from the list of factors considered by the target machine learning model that led to the incorrect decision. For example, monitoring program 110A,110B may identify a target machine learning model M1 that has made an incorrect decision on a model prediction related to the determination of whether a particular individual should be given a loan. Monitoring program 110A,110B may identify factors considered by machine learning model M1, including, for example, age, location, salary, and credit score. Monitoring program 110A,110B may then identify whether any of these factors may have led to the incorrect decision by comparing the factors considered to historical data.

At 212, monitoring program 110A,110B may automatically generate an updated efficacy score and a criticality score for the target machine learning model. In the context of this disclosure, the efficacy score represents a trust score reflecting how accurate a given machine learning model's predictions are. For exemplary target machine learning model M1 discussed above, monitoring program 110A,110B may generate an updated efficacy score for machine learning model M1 to reflect the incorrect decision detected at 210. The criticality score is a measure of how important a given prediction or decision by a given machine learning model is. The criticality score may be determined by considering a number of factors including domain, number of use cases, frequency of training, required level of accuracy, and volatility of predictive factors. For example, monitoring program 110A,110B may consider model metadata and historical predictions of exemplary machine learning model M1 and determine that machine learning model M1 requires a high level of accuracy, has high volatility for its predictive factors, and requires very frequent training. Accordingly, monitoring program 110A,110B will consider these factors to generate a corresponding criticality score for machine learning model M1. Monitoring program 110A,110B may consider various other factors in calculating either efficacy scores or criticality scores for a given machine learning model as may be suitable for a specific domain or environment, such as, for example, drift in dimensions of other considered features, historical retraining or maintenance data, model workflow data, historical data of associated terms related to dimensions that are prone to drift, and model drifted transactions where a given model is known to make wrong predictions even within test data.

At 214, monitoring program 110A,110B automatically detects a corresponding cluster that includes a set of machine learning models that utilize the identified one or more factors considered by the target machine learning model that led to the incorrect decision. For example, if monitoring program 110A,110B detected that an exemplary machine learning model M1 was making incorrect decisions or predictions based upon a set of factors including factors A, B, and C, monitoring program 110A,110B will automatically detect a corresponding exemplary cluster C1 including other machine learning models that consider similar factors in making predictions.

At 216, monitoring program 110A,110B automatically calculates a combined score using the efficacy score and the criticality score to determine and output an alert corresponding to a suggested remedial action for the target machine learning model. The combined score is a representation of the extent to which the target machine learning model is likely to need maintenance. Generally, as criticality score increases and efficacy score decreases, the combined score will increase in value, indicating that the target machine learning model should likely be scheduled for maintenance and retraining. In embodiments, monitoring program 110A, 110B includes model governance properties that allow it to output a range of remedial actions depending on the value of the combined score. For example, monitoring program 110A,110B may output remedial actions in the form of color-coded alerts to reflect the calculated combined score being above a certain threshold. For example, if the calculated combined score is represented as a value between 0 and 1, 0 indicating less model drift and 1 indicating more model drift, monitoring program 110A,110B may output a suggested remedial action for calculated combined scores above 0.9 that include a 'Red Alerts' indicating that the target machine learning model should be immediately taken off from deployment for retraining. Alternatively, monitoring program 110A,110B may output a suggested remedial action for calculated scores between 0.6 and 0.9 that include 'Orange Alerts' indicating that maintenance should be scheduled for the target machine learning model within a suitable pre-determined time frame that reflects the calculated combined score.

Thereafter, at 218, monitoring program 110A,110B automatically calculates a correlation score between the target machine learning model and machine learning models within an associated corresponding cluster of similar machine learning models, and in response to detecting a correlation score above a threshold, automatically determine and output a cluster reinforcement recommendation. As discussed above, embodiments described herein provide the ability to actively monitor and maintain many machine learning models at once using governance. At step 218, monitoring program 110A,110B is able to provide these capabilities by utilizing the clusters of similar machine learning models generated at 208. For example, if monitoring program 110A,110B outputs a 'Red Alert' for a target machine learning model M1 contained in a Cluster C1 including machine learning models M2 and M3, monitoring program 110A,110B will then calculate a correlation score between machine learning models M1 and M2, and M1 and M3, as they are in the same cluster C1. In an exemplary embodiment, the correlation score may be represented as a number between 0 and 1, where a correlation score of 1 indicates that target machine learning model and the model it is being compared to consider identical factors in making predictions and a correlation score of 0 indicates no similarities between the machine learning models. Monitoring program 110A,110B may also consider the weights assigned to factors considered by machine learning models being compared to calculate an updated correlation score. If monitoring program 110A,110B determines for example that machine learning model M1, M2, and M3 consider factors F1-F5 and factors F1-F4 are considered by each of the machine learning models with similar weights assigned to each factor, monitoring program 110A,110B may calculate a correlation score that is around 0.9 and output a cluster reinforcement recommendation that includes a remedial action that is the same as what was output at 216 for the target machine learning model M1 (a 'Red Alert' indicating maintenance and retraining should be provided immediately). Alternatively, using the same example, if monitoring program 110A,110B determines that target machine learning model M1 considers factors F1-F5, but machine learning models M2-M3 consider F1-F8, and the predictions of M2-M3 are weighted to be more dependent upon Factors F6-F8 (factors not even considered by target machine learning model M1), then monitoring program 110A,110B may calculate a correlation score that is less than 0.7 and output a cluster reinforcement recommendation including an 'Orange Alert'. In this example, in response to detecting a correlation score below a certain threshold, monitoring program 110A,110B has output a cluster reinforcement recommendation that is different from the suggested remedial action for the target machine learning model that reflects that the urgency for maintenance and retraining is lesser because of the differences between the models in the same cluster. At the same time, the output cluster reinforcement recommendation still reflects the similarity between machine learning models M1-M3 in the factors that they utilize in making predictions and their susceptibility to concept drift of factors F1-F5 over time. This demonstrates the comprehensive nature of monitoring program 110A, 110B and the flexibility it provides while maintaining systems including multiple machine learning models.

The examples provided above are merely examples. Monitoring program 110A,110B may be configured to consider a variety of factors in calculating the correlation score. In addition to considering which factors are considered by each machine learning model and the weight of those factors, monitoring program 110A,110B may further consider historical frequency of retraining and maintenance, historical data regarding which factors required relabeling or retraining, or any other useful factors or datapoints. Additionally, monitoring program may be configured to output a variety of reinforcement recommendations at various predetermined correlation score thresholds as may be desired by a given user in a specific domain or environment. For example, in environments in which maintenance is highly prioritized, a user may configure monitoring program 110A, 110B to more readily output reinforcement recommendations and remedial actions by the lowering thresholds discussed above, increasing the number of factors considered in calculating the combined score or correlation score discussed above, or adjusting the weights of the factors considered in calculating the combined score or correlation scores. Thus, monitoring program 110A,110B provides an improved method for monitoring multiple machine learning models at once and providing a comprehensive flexible process for maintaining the models and rectifying concept drift detected therein using governance.

It may be appreciated that FIGS. 2A-2B, and FIG. 3 provide only illustrations of an exemplary implementation and do not imply any limitations with regard to how different embodiments may be implemented. Many modifications to the depicted environments may be made based on design and implementation requirements.

Figure 4:
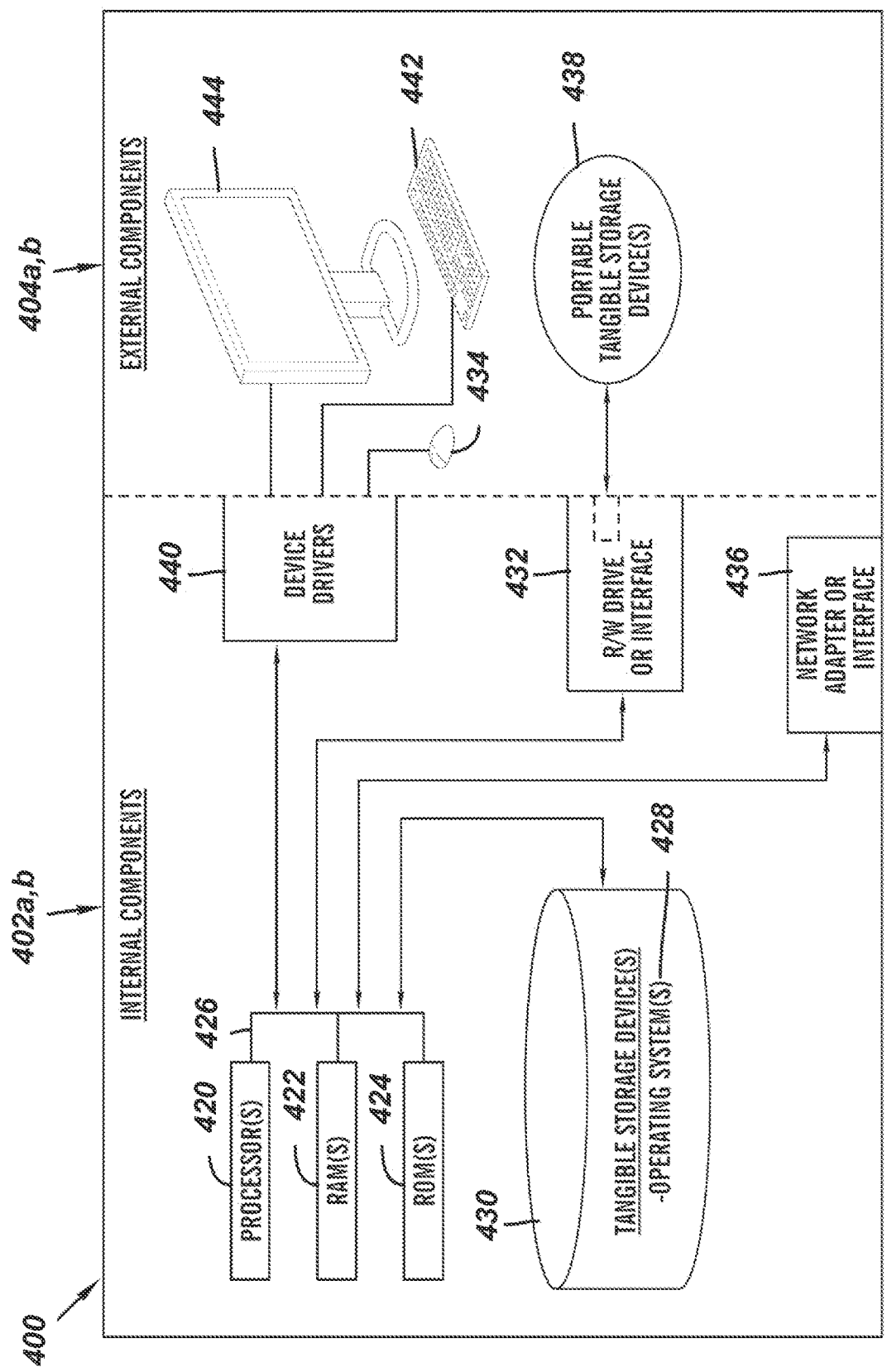
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present disclosure. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the monitoring program 110A in the client computing device 102 and the monitoring program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the monitoring program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the monitoring program 110A in the client computing device 102 and the monitoring program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the monitoring program 110A in the client computing device 102 and the monitoring program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 include hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
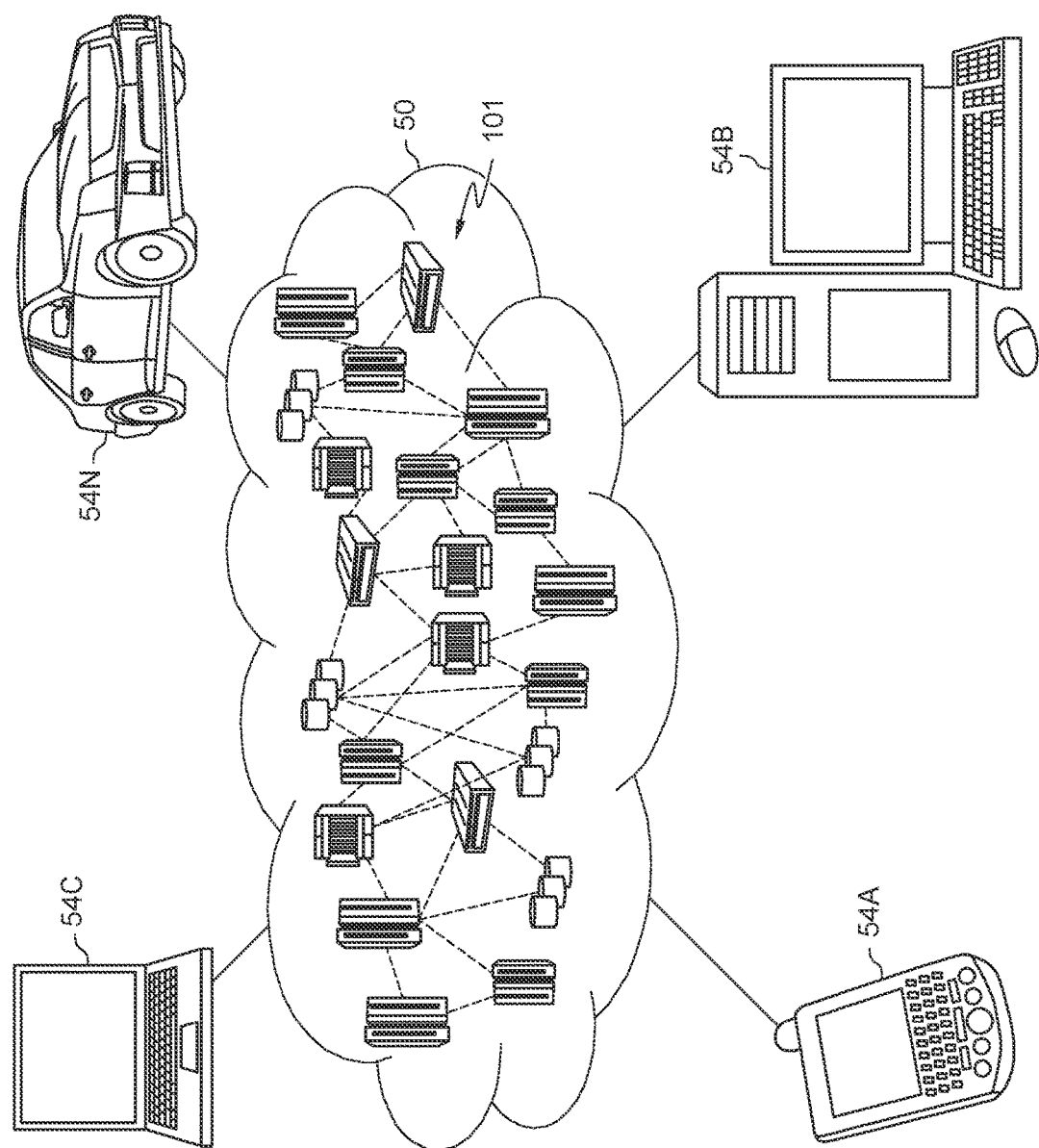
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 101 with which local computing devices used by cloud consumers, such as, for example, personal digital assistant (PDA) or cellular telephone 54A, desktop computer 54B, laptop computer 54C, and/or automobile computer system 54N may communicate. Nodes 101 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
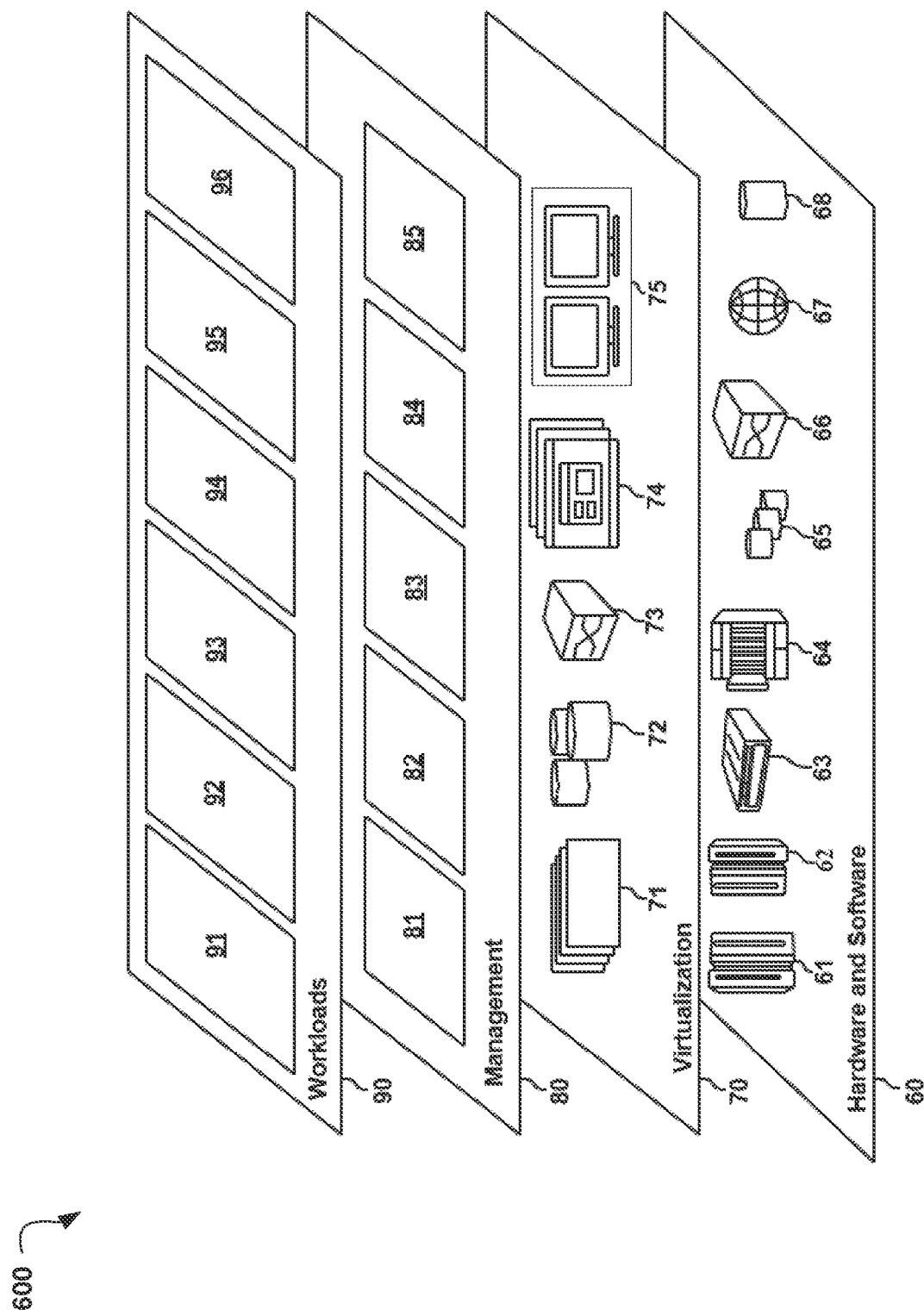
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; monitoring program 96. Monitoring program 96 may relate to monitoring machine learning models to detect and rectify model drift using governance.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of monitoring machine learning models to detect and rectify model drift using governance, the method comprising:
receiving a plurality of machine learning models, and registering the plurality of machine learning models to a governance dashboard;
automatically monitoring the plurality of machine learning models to identify a set of features used by each of the plurality of machine learning models, and mapping the set of features to a business glossary to generate a list of factors used by each of the plurality of machine learning models;
automatically comparing the list of factors used by each of the plurality of machine learning models to generate corresponding clusters of similar machine learning models;
automatically detecting an incorrect decision made by a target machine learning model associated with the plurality of machine learning models and identifying one or more factors from the list of factors used by the target machine learning model that led to the incorrect decision;
automatically generating an updated efficacy score and a criticality score for the target machine learning model;
automatically calculating a combined score using the updated efficacy score and the criticality score to determine and output an alert including a suggested remedial action for the target machine learning model; and
automatically calculating a correlation score between the target machine learning model and the plurality of machine learning models within an associated corresponding cluster of similar machine learning models that utilize the one or more factors from the list of factors used by the target machine learning model that led to the incorrect decision, and in response to detecting the correlation score above a threshold, automatically determining and outputting a cluster reinforcement recommendation.

2. The method of claim 1, wherein automatically monitoring the plurality of machine learning models to identify the set of features used by each of the plurality of machine learning models further comprises:
automatically calculating Shapley Additive explanations (SHAP) values for each feature in the set of features.

3. The method of claim 1, wherein automatically calculating the correlation score between the target machine learning model and the plurality of machine learning models within the associated corresponding cluster of similar machine learning models that utilize the one or more factors from the list of factors used by the target machine learning model that led to the incorrect decision further comprises:
automatically determining weights assigned to each of the one or more factors from the list of factors used by the target machine learning model and the plurality of machine learning models within the associated corresponding cluster, and then using the weights assigned to calculate an updated correlation score.

4. The method of claim 1, wherein the suggested remedial action comprises retraining the target machine learning model and the associated corresponding cluster of similar machine learning models.

5. The method of claim 1, wherein automatically calculating the combined score using the updated efficacy score and the criticality score to determine and output the alert including the suggested remedial action for the target machine learning model further comprises:
automatically updating the criticality score based upon a historical frequency of training or maintenance performed on the target machine learning model.

6. The method of claim 1, wherein the cluster reinforcement recommendation is the suggested remedial action for the target machine learning model.

7. The method of claim 1 further comprising:
in response to detecting the correlation score below the threshold, adjusting the cluster reinforcement recommendation to be different from the suggested remedial action for the target machine learning model.

8. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
receiving a plurality of machine learning models, and registering the plurality of machine learning models to a governance dashboard;
automatically monitoring the plurality of machine learning models to identify a set of features used by each of the plurality of machine learning models, and mapping the set of features to a business glossary to generate a list of factors used by each of the plurality of machine learning models;

automatically comparing the list of factors used by each of the plurality of machine learning models to generate corresponding clusters of similar machine learning models;

automatically detecting an incorrect decision made by a target machine learning model associated with the plurality of machine learning models and identifying one or more factors from the list of factors used by the target machine learning model that led to the incorrect decision;

automatically generating an updated efficacy score and a criticality score for the target machine learning model;

automatically calculating a combined score using the updated efficacy score and the criticality score to determine and output an alert including a suggested remedial action for the target machine learning model; and automatically calculating a correlation score between the target machine learning model and the plurality of machine learning models within an associated corresponding cluster of similar machine learning models that utilize the one or more factors from the list of factors used by the target machine learning model that led to the incorrect decision, and in response to detecting the correlation score above a threshold, automatically determining and outputting a cluster reinforcement recommendation.

9. The computer system of claim 8, wherein automatically monitoring the plurality of machine learning models to identify the set of features used by each of the plurality of machine learning models further comprises:
automatically calculating Shapley Additive explanations (SHAP) values for each feature in the set of features.

10. The computer system of claim 8, wherein automatically calculating the correlation score between the target machine learning model and the plurality of machine learning models within the associated corresponding cluster of similar machine learning models that utilize the one or more factors from the list of factors used by the target machine learning model that led to the incorrect decision further comprises:
automatically determining weights assigned to each of the one or more factors from the list of factors used by the target machine learning model and the plurality of machine learning models within the associated corresponding cluster, and then using the weights assigned to calculate an updated correlation score.

11. The computer system of claim 8, wherein the suggested remedial action comprises retraining the target machine learning model and the associated corresponding cluster of similar machine learning models.

12. The computer system of claim 8, wherein automatically calculating the combined score using the updated efficacy score and the criticality score to determine and output the alert including the suggested remedial action for the target machine learning model further comprises:
automatically updating the criticality score based upon a historical frequency of training or maintenance performed on the target machine learning model.

13. The computer system of claim 8, wherein the cluster reinforcement recommendation is the suggested remedial action for the target machine learning model.

14. The computer system of claim 8, further comprising:
in response to detecting the correlation score below the threshold, adjusting the cluster reinforcement recommendation to be different from the suggested remedial action for the target machine learning model.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
receiving a plurality of machine learning models, and registering the plurality of machine learning models to a governance dashboard;

automatically monitoring the plurality of machine learning models to identify a set of features used by each of the plurality of machine learning models, and mapping the set of features to a business glossary to generate a list of factors used by each of the plurality of machine learning models;

automatically comparing the list of factors used by each of the plurality of machine learning models to generate corresponding clusters of similar machine learning models;

automatically detecting an incorrect decision made by a target machine learning model associated with the plurality of machine learning models and identifying one or more factors from the list of factors used by the target machine learning model that led to the incorrect decision;

automatically generating an updated efficacy score and a criticality score for the target machine learning model;

automatically calculating a combined score using the updated efficacy score and the criticality score to determine and output an alert including a suggested remedial action for the target machine learning model; and automatically calculating a correlation score between the target machine learning model and the plurality of machine learning models within an associated corresponding cluster of similar machine learning models that utilize the one or more factors from the list of factors used by the target machine learning model that led to the incorrect decision, and in response to detecting the correlation score above a threshold, automatically determining and outputting a cluster reinforcement recommendation.

16. The computer program product of claim 15, wherein automatically monitoring the plurality of machine learning models to identify the set of features used by each of the plurality of machine learning models further comprises:
automatically calculating Shapley Additive explanations (SHAP) values for each feature in the set of features.

17. The computer program product of claim 15, wherein automatically calculating the correlation score between the target machine learning model and the plurality of machine learning models within the associated corresponding cluster of similar machine learning models that utilize the one or more factors from the list of factors used by the target machine learning model that led to the incorrect decision further comprises:
automatically determining weights assigned to each of the one or more factors from the list of factors used by the target machine learning model and the plurality of machine learning models within the associated corresponding cluster, and then using the weights assigned to calculate an updated correlation score.

18. The computer program product of claim 15, wherein automatically calculating the combined score using the updated efficacy score and the criticality score to determine and output the alert including the suggested remedial action for the target machine learning model further comprises:
  automatically updating the criticality score based upon a historical frequency of training or maintenance performed on the target machine learning model.

19. The computer program product of claim 15, wherein the cluster reinforcement recommendation is the suggested remedial action for the target machine learning model.

20. The computer program product of claim 15, further comprising:
  in response to detecting the correlation score below the threshold, adjusting the cluster reinforcement recommendation to be different from the suggested remedial action for the target machine learning model.

* * * * *